(12) United States Patent
Zhang et al.

(10) Patent No.: US 8,513,521 B2
(45) Date of Patent: Aug. 20, 2013

(54) ELECTRONIC DEVICE ENCLOSURE HAVING A CABLE HOLDING DEVICE

(75) Inventors: Xiang Zhang, Wuhan (CN); Cai-Hong Zou, Wuhan (CN); Qiu-Hua Peng, Wuhan (CN); Zhi-Guo Zhang, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 17 days.

(21) Appl. No.: 13/289,999

(22) Filed: Nov. 4, 2011

(65) Prior Publication Data

US 2012/0217054 A1      Aug. 30, 2012

(30) Foreign Application Priority Data

Feb. 25, 2011   (CN) .......................... 2011 1 0046268

(51) Int. Cl.
*H02G 3/18* (2006.01)
(52) U.S. Cl.
USPC ............... 174/60; 174/100; 174/500; 174/64; 439/501; 248/49

(58) Field of Classification Search
USPC .................. 174/100, 500, 60, 64, 68.1, 68.3, 174/72 A, 97; 439/501, 502; 248/49
See application file for complete search history.

(56) References Cited

U.S. PATENT DOCUMENTS

| | | | | |
|---|---|---|---|---|
| 4,224,465 A | * | 9/1980 | Ruzic ............................ | 174/135 |
| 5,789,702 A | * | 8/1998 | Perella ......................... | 174/481 |
| 6,207,893 B1 | * | 3/2001 | Guiol ............................ | 174/378 |
| 7,030,322 B2 | * | 4/2006 | Preissl et al. ............... | 174/138 R |
| 7,128,598 B2 | * | 10/2006 | Ebert et al. .................... | 439/495 |
| 7,587,795 B2 | * | 9/2009 | Yamamoto .................. | 24/129 R |
| 7,675,740 B2 | * | 3/2010 | Rasmussen et al. .......... | 361/627 |

* cited by examiner

Primary Examiner — Dhirubhai R Patel
(74) Attorney, Agent, or Firm — Altis Law Group, Inc.

(57) ABSTRACT

An electronic device enclosure includes a main enclosure, a cable holding device received in the main enclosure, and a cable which held by the cable holding device in different orientations. A first positioning slot and a second positioning slot are defined in the cable holding device. The cable is guided out of the cable holding device in one or more predetermined directions.

20 Claims, 4 Drawing Sheets

ELECTRONIC DEVICE ENCLOSURE HAVING A CABLE HOLDING DEVICE

BACKGROUND

1. Technical Field

The present disclosure relates to electronic device enclosures, more particularly to an electronic device enclosure having a cable holding device.

2. Description of Related Art

A front plate of an electronic device, such as a computer, often presents an array of sockets for connecting to a plurality of peripheral components, such as an earphone, a keyboard, and a mouse. Many signal cables are connected behind the array of sockets in the interior of the enclosure, to a motherboard or a circuit board. However, loose or irregularly placed cables may interfere with electronic components or be damaged by the components in the electronic device enclosure over a period of time.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
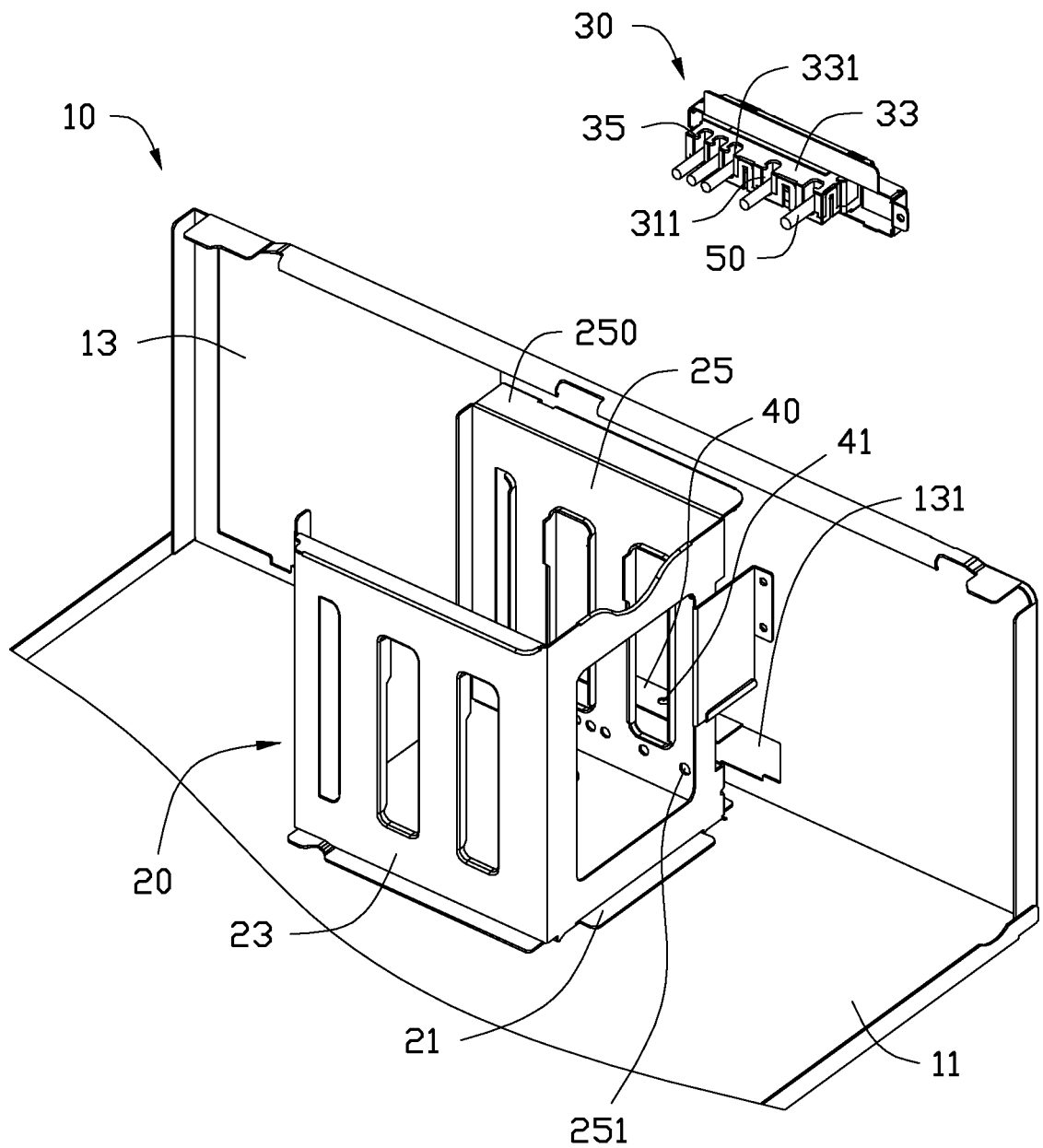
FIG. 1 is a partially exploded, cutaway view of one embodiment of an electronic device, the electronic device enclosure including a main enclosure, a bracket, and a cable holding device.
Figure 2:
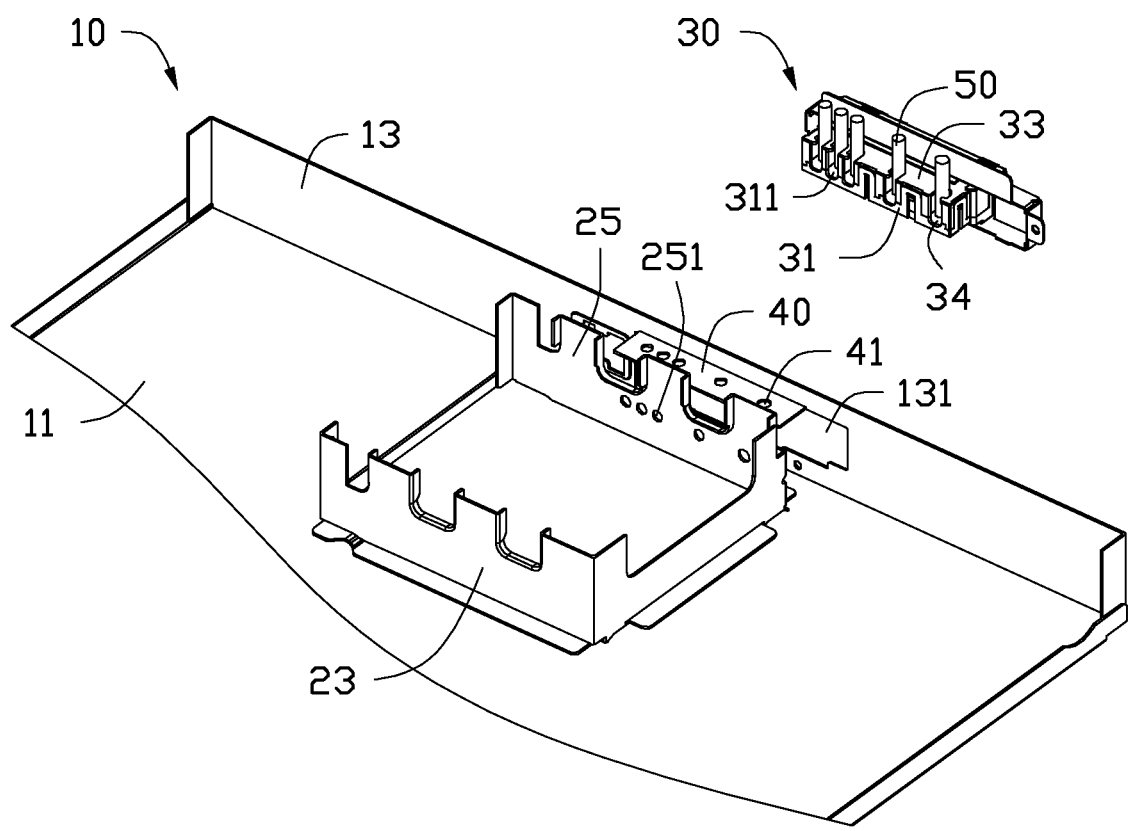
FIG. 2 is similar to FIG. 1, but showing the bracket and the cable holding device in a different configuration.

Referring to FIGS. 1 and 2, one embodiment of an electronic device enclosure includes a main enclosure 10, a bracket 20 received in the main enclosure 10, and a cable holding device 30 attached to the bracket 20. The bracket 20 can be a disk drive bracket. In one embodiment, the cable holding device 30 may provide support for all input and output connections of the electronic device.

The main enclosure 10 includes a bottom plate 11 and a front plate 13 connected to the bottom plate 11. In one embodiment, the front plate 13 is substantially perpendicular to the bottom plate 11.

A disk drive bracket 20 sits on the bottom plate 11 and includes a base 21 abutting the bottom plate 11 and two side panels 23, 25. In one embodiment, the two side panels 23, 25 are substantially parallel each other and perpendicular to the base 21. The side panel 25 is adjacent to the front plate 13 and defines a plurality of first through holes 251. The plurality of through holes 251 is arranged in a straight line and located on a bottom of the side panel 25. A connecting panel 250 extends from the top edge of the side panel 25. In one embodiment, the connecting panel 250 abuts the side panel 25 and covers the space between the side panel 25 and the front plate 13.

An opening 131 is defined in the front plate 13, and a securing board 40 is connected to the top edge of the opening 131. The securing board 40 defines a plurality of second through holes 41. In one embodiment, the total number of first through holes 251 is equal to that of the second through holes 41, and the securing board 40 is substantially perpendicular to the front plate 13 and substantially parallel to the connecting panel 250.

The cable holding device 30 includes a first side plate 31 and a second side plate 33 connected to the first side plate 31. A plurality of first positioning slots 311, corresponding to the plurality of first and second through holes 251, 41, is defined in the first side plate 31. A plurality of second positioning slots 331, also corresponding to the plurality of first and second through holes 251, 41, is defined in the second side plate 33. Each first positioning slot 311 communicates with each second positioning slot 331, and a connecting plane 34 is connected to each of the first positioning slots 311. An extending direction of each first positioning slot 311 is different from that of each second positioning slot 331. In one embodiment, the direction of each first positioning slot 311 is substantially perpendicular to that of each second positioning slot 331. A protrusion 35 extends from the second side plate 33 and is located between each first positioning slot 311 and each second positioning slot 331. The protrusion 35 acts as a separator and a physical impediment between each first positioning slot 311 and each second positioning slot 331. In one embodiment, the width of each first positioning slot 311 is substantially equal to that of each second positioning slot 331, but each first positioning slot 311 is longer than each second positioning slot 331.

A plurality of cables 50 is connected to a first side of the cable holding device 30, and a plurality of interfaces (not shown) is defined in a second side of the cable holding device 30. Each cable 50 is flexible after the point of connection to the cable holding device 30 and may be located in a first position or a second position. In the first position, each of the plurality of cables 50 extending out of the first positioning slots 311 is substantially perpendicular to the first side plate 31. In the second position, each of the plurality of cables 50 extending out of the second positioning slots 331 is substantially parallel to the first side plate 31. In one embodiment, the protrusions 35 are clipped to the plurality of cables 50, if the plurality of cables 50 is located in the first or second position.

Figure 3:
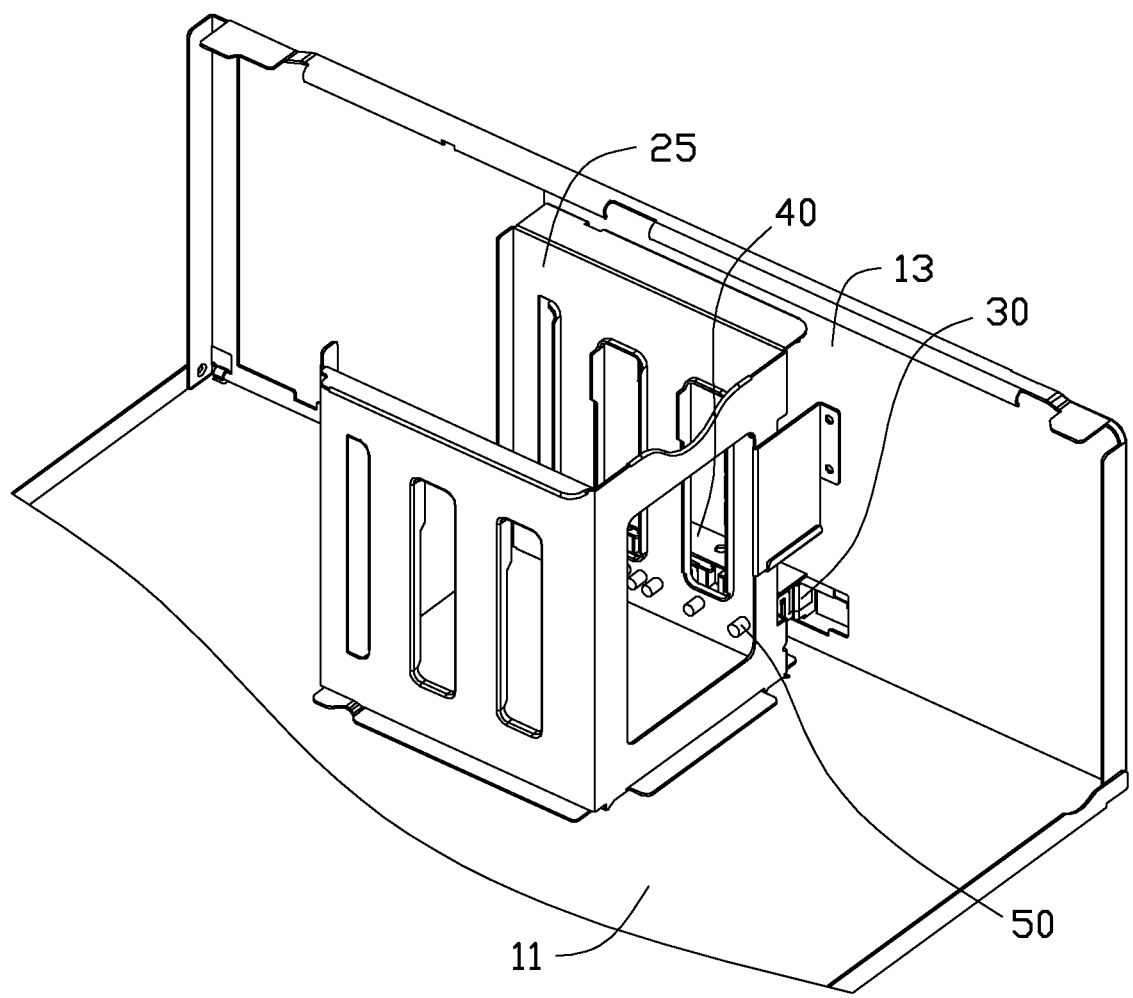
FIG. 3 is an assembled view of FIG. 1.

Referring to FIG. 3, if the plurality of cables 50 is located in the first position, each of the plurality of cables 50 passes through the corresponding first through holes 251. Therefore, the plurality of cables 50 can be electronically connected to a first electronic component (not shown).

Figure 4:
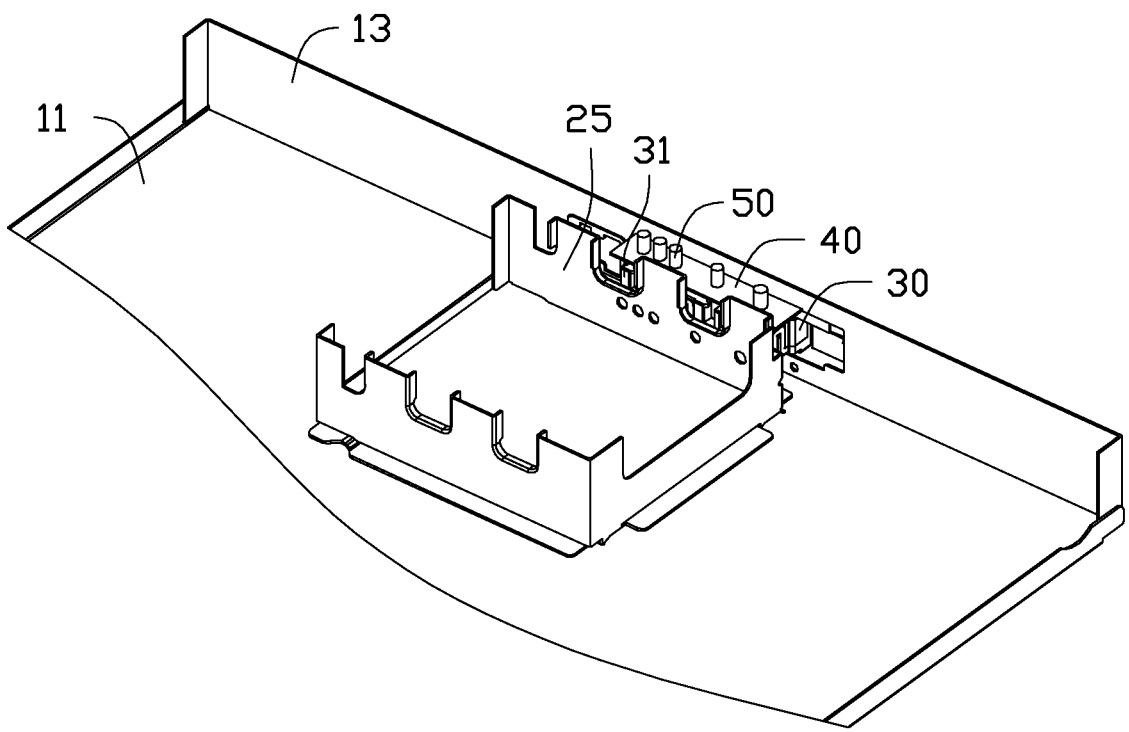
FIG. 4 is an assembled view of FIG. 2.

Referring to FIG. 4, if the plurality of cables 50 is located in the second position, each of the plurality of cables 50 passes through the corresponding second through holes 41. Therefore, the plurality of cables 50 can be electronically connected to a second electronic component (not shown).

Although numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An electronic device enclosure comprising:
a main enclosure comprising a bottom plate, a front plate connected to the bottom plate, and a securing board extending from the front plate;
a cable holding device received in the main enclosure and secured to the front plate and defining a first positioning slot and a second positioning slot in the cable holding device, the first positioning slot communicating with the second positioning slot, and an extending direction of the first positioning slot being different from that of the second positioning slot;
a cable electronically connected to the cable holding device; and
a bracket comprising a side panel and a bottom panel secured to the bottom plate;
wherein the side panel defines a first through hole, and the securing board defines a second through hole; the cable is flexible relative to the cable holding device between a first position and a second position; in the first position, the cable is received in the first positioning slot and extends through the first through hole, and in the second position, the cable is received in the second positioning slot and extends through the second through hole.

2. The electronic device enclosure of claim 1, wherein an extending direction of the first positioning slot is substantially perpendicular to that of the second positioning slot.

3. The electronic device enclosure of claim 1, wherein the cable holding device comprises a first side plate and a second side plate connected to the first side plate, the first positioning slot is defined in the first side plate, and the second positioning slot is defined in the second plate.

4. The electronic device enclosure of claim 3, wherein the first side plate is substantially parallel to the side panel, and the second side plate is substantially parallel to the securing board.

5. The electronic device enclosure of claim 1, wherein the cable holding device comprises a protrusion, the protrusion is located between the first positioning slot and the second positioning slot, and the protrusion is engaged with the cable when the cable is located in the first and second positions.

6. The electronic device enclosure of claim 5, wherein a free edge of the protrusion is arcuate.

7. The electronic device enclosure of claim 1, wherein a width of the first positioning slot is substantially perpendicular to that of the second positioning slot.

8. The electronic device enclosure of claim 1, wherein a length of the first positioning slot is larger than that of the second positioning slot.

9. The electronic device enclosure of claim 1, wherein the securing board is substantially perpendicular to the front plate.

10. The electronic device enclosure of claim 9, wherein the side panel is substantially parallel to the front plate.

11. The electronic device enclosure of claim 1, wherein a connecting plane is connected to the first positioning slot and the second positioning slot, and the cable extends from the connecting plane if the cable is located in the first position or the second position.

12. An electronic device enclosure comprising:
a main enclosure comprising a bottom plate, a front plate connected to the bottom plate, and a securing board extending from the front plate;
a cable holding device received in the main enclosure and secured to the front plate and comprising a first side plate and a second side plate substantially perpendicular to the first side plate, a first positioning slot being defined in the first side plate and a second positioning slot being defined in the second side plate, the first positioning slot communicating with the second positioning slot, and a connecting plane connecting to the first positioning slot and the second positioning slot,
a bracket comprising a side panel and a bottom panel secured to the bottom plate, and the side panel defining a first through hole; and the securing board defining a second through hole; and
a cable electronically connected to the cable holding device and extending from the connecting plane to be received in the first positioning slot and extending through the first through hole;
wherein the cable is flexible relative to the cable holding device, and extends from the connecting plane to engage in the second positioning slot and extend through the second through hole from the first through hole.

13. The electronic device enclosure of claim 1, wherein an extending direction of the first positioning slot is different from that of the second positioning slot.

14. The electronic device enclosure of claim 13, wherein an extending direction of the first positioning slot is substantially perpendicular to that of the second positioning slot.

15. The electronic device enclosure of claim 12, wherein the cable holding device comprises a protrusion located between the first positioning slot and the second positioning slot, and the protrusion is engaged with the cable if the cable is engaged in the first and second positioning slots.

16. The electronic device enclosure of claim 15, wherein a free edge of the protrusion is arcuate.

17. The electronic device enclosure of claim 12, wherein a width of the first positioning slot is substantially perpendicular to that of the second positioning slot.

18. The electronic device enclosure of claim 12, wherein a length of the first positioning slot is larger than that of the second positioning slot.

19. The electronic device enclosure of claim 12, wherein the securing board is substantially perpendicular to the front plate, and the side panel is substantially parallel to the front plate.

20. The electronic device enclosure of claim 12, wherein the first side plate is substantially parallel to the side panel, and the second side plate is substantially parallel to the securing board.

* * * * *